US00RE42419E

(19) United States
(12) Reissued Patent
Anderson

(10) Patent Number: US RE42,419 E
(45) Date of Reissued Patent: Jun. 7, 2011

(54) STRING INSTRUMENT CHINREST PAD SYSTEM

(76) Inventor: Gary L. Anderson, Fort Worth, TX (US)

(21) Appl. No.: 11/435,390

(22) Filed: May 16, 2006

Related U.S. Patent Documents

Reissue of:
(64) Patent No.: 6,927,328
Issued: Aug. 9, 2005
Appl. No.: 10/670,939
Filed: Sep. 25, 2003

(51) Int. Cl.
*G10D 1/02* (2006.01)

(52) U.S. Cl. ..... 84/279; 84/278; 84/280

(58) Field of Classification Search ..... 84/278, 84/279, 280
See application file for complete search history.

(56) References Cited

U.S. PATENT DOCUMENTS

| | | | | |
|---|---|---|---|---|
| 6,193 A | | 3/1849 | Myrick | 416/246 |
| 104,405 A | | 6/1870 | Avery | 84/279 |
| 160,136 A | | 2/1875 | Albert | 84/279 |
| 213,804 A | | 4/1879 | Barnes | 84/279 |
| 439,199 A | | 10/1890 | Schuster | 84/279 |
| 576,950 A | * | 2/1897 | Coloney | 84/279 |
| 651,436 A | * | 6/1900 | Coffron | 84/278 |
| 931,251 A | | 8/1909 | Beisheim | 84/279 |
| 1,204,642 A | | 11/1916 | Becker | 84/279 |
| 1,311,670 A | * | 7/1919 | Watson | 84/279 |
| 1,821,811 A | | 9/1931 | Mai | 84/279 |
| 2,223,221 A | | 11/1940 | Miranda | 84/279 |
| 2,486,646 A | | 11/1949 | Halko | 84/279 |
| 4,534,259 A | | 8/1985 | Wolf | 84/279 |
| 6,667,430 B1 | * | 12/2003 | Liao | 84/279 |

* cited by examiner

*Primary Examiner* — Kimberly R Lockett
(74) *Attorney, Agent, or Firm* — Charles D. Gunter, Jr.

(57) ABSTRACT

A chinrest pad system designed to hold a standard chinrest used with a string instrument that minimizes dampening of vibration and prevents damage caused by the metal components touching the edges of the instrument. The system includes pads located under the support surface of the chinrest member and on top of the lower lip plate used on the lower clamping member. The pads are specifically designed to partially engage the instrument's upper and lower edges and match the curvature of instrument surface immediately adjacent to the edge. Each pad also includes a rear extending lip that bends slightly around the upper or lower edge and extends rearward to prevent the metal rods used with the turnbuckles from contacting the rear surface. During assembly, the pads are positioned over the upper and lower edges so that the compression forces exerted by the support surface and the lower lip plate are centrally located over the sidewall transverse axis, thereby minimizing dampening of vibration.

17 Claims, 3 Drawing Sheets

STRING INSTRUMENT CHINREST PAD SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention pertains to musical instruments, and more particularly to chinrests used with string instruments.

2. Description of the Related Art

The violin, in the most general sense, is a musical instrument that vibrates when played. The degree of vibration and resonance of the instrument is directly related to the degree that the wood is allowed to vibrate freely. Anything that clamps onto the body of the instrument, particularly the top and bottom surfaces, will dampen or impede vibration.

A chinrest is a traditional part of a violin or viola, which allows the player to rest his or her chin while playing, without the chin touching the instrument. Normally, the chinrest includes a black, curved chinrest member made of plastic or wood that is positioned over the top surface of the instrument. The chinrest member is held in position by two clamping elements. Each clamping element includes an upper metal rod, a lower metal rod, and a turnbuckle. During installation on the instrument, the chinrest member is positioned over the instrument so that its flat support surface located on its bottom surface rests on a flat pad. The flat pad partially rests on the angled upper edge, but mostly rests on the top surface of the instrument. Because the upper edge is angled, the flat pad and chinrest member have a tendency to slide inward toward a flat region located immediately adjacent to the angled upper edge and medially to the instrument's sidewall. When the flat pad rests on the flat region and onto the top surface of the instrument, vibration is impeded.

The lower metal rod used with each clamping element includes a flange designed to capture the angled lower edge of the instrument. When the chinrest member slides inward, the upper and lower metal rods, upon which the turnbuckle rotates, contact the upper and lower edges of the instrument, which will impede vibration and can potentially cause damage to the instrument.

SUMMARY OF THE INVENTION

It is an object of the present invention to provide an improved chinrest pad system that can be used with a standard chinrest that securely holds the chinrest on the instrument in an optimal position for maximum vibration.

It is another object of the present invention to provide such a pad system that prevents the chinrest from sliding on the instrument while being played with minimal compression forces applied to the instrument.

It is another object of the present invention to provide such a pad system that prevents the metal rods used with the clamping elements from contacting the upper and lower edges and impeding vibration and potentially causing damage.

These and other objects of the invention are met by a chinrest pad system disclosed herein designed to securely hold a standard chinrest used on a string instrument that minimizes the clamping pressure and dampening of vibration, and prevents damage by preventing the metal components from touching the sides of the instrument. The system includes an upper resilient pad disposed between the support surface of the chinrest member and the top angled surface of the instrument, and at least one lower resilient pad disposed between the lower flange on the lower metal rod and the bottom angled surface of the instrument. The upper and lower pads are specifically designed to partially bend around and engage the instrument's upper and lower edges, respectively. Each pad also includes a rear extending lip that extends rearward and prevents the metal rods from contacting the upper and lower edges. Each pad includes an inside surface designed to match the curvature of instrument's surface immediately adjacent to the edge. The opposite outside surface of each pad is designed to match the angle of the adjacent surface on the chinrest member and flange. The width of each pad is sufficient so that each pad is centered over the sidewall of the instrument so that the compression forces exerted by the support surface and flange are aligned with the sidewall's transverse axis.

DESCRIPTION OF THE PREFERRED EMBODIMENT(S)

Figure 1:
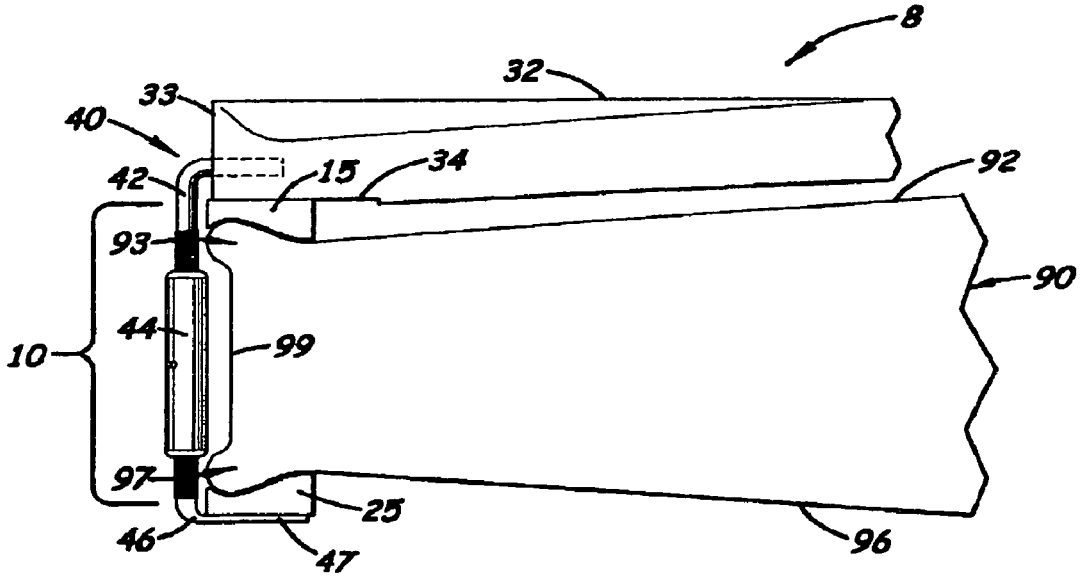
FIG. 1 is a side elevational view of a violin with a standard chinrest with the chinrest pad system used thereon.

There is shown in the accompanying FIGS. a string instrument chinrest pad system 10 designed to be mounted on the rear surface of a string instrument 90, such as a violin, that overcomes the problems associated with chinrest designs found in the prior art.

The system 10 includes an upper pad 15 and a lower pad specifically designed to be used under the flat support surface 34 found on a typical chinrest member 32 and over the lower flange 47 used with a standard clamping element 40 used with the string instrument 90, respectively. The pads 15, 25 are specifically designed to partially engage the instrument's upper and lower edges 93, 97 and to conform to the adjacent top and bottom surfaces 92, 96 prior to applying a compression force so that the chinrest member 32 does not move. The outside surfaces 18, 28 of the pads 15, 25 are also designed to match the adjacent surfaces of the support surface 34 and the lower flange 47, respectively, to prevent movement of the chinrest member 32.

Figure 3:
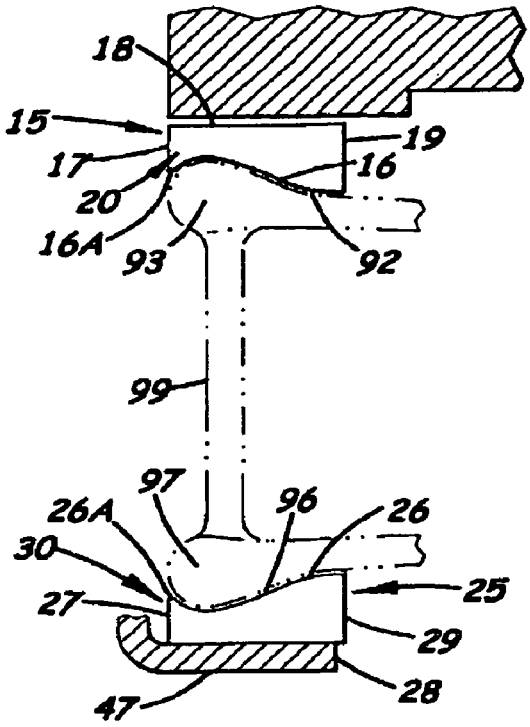
FIG. 3 is a side elevational view of the chinrest pad system more clearly showing the upper and lower pad aligned over the transverse axis of the instrument's sidewall.
Figure 4:
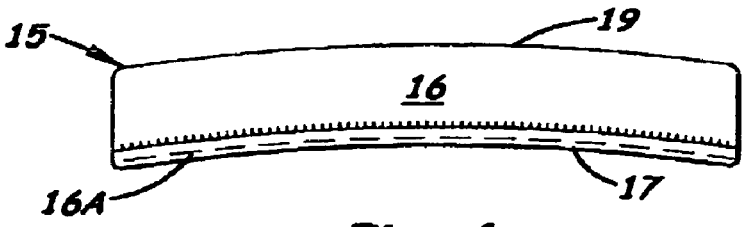
FIG. 4 is a bottom plan view of an elongated upper pad.

As shown in FIG. 3, the upper pad 15 includes an inside surface 16, an outside surface 18, a front surface 17 and a rear surface 19. In the preferred embodiment, the upper pad 15 is a slightly curved, rectangular structure with parallel front and rear surfaces 17, 19, respectively, that match the curvature of the upper edge 93 on an instrument 90. As mentioned above, the inside surface 16 is specifically designed to match the curvature of the section of the instrument's top surface 92 immediately adjacent to the upper edge 93. The rear surface 19 is substantially perpendicular to the outside surface 18. A short segment 16A of the inside surface 16 adjacent to the rear surface 19 is horizontally aligned, thereby creating a short lip structure 20 that extends rearward from the upper edge 93.

Figure 5:
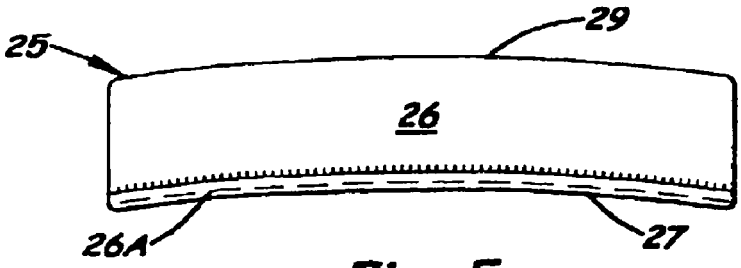
FIG. 5 is a top plan view of an elongated lower pad.
Figure 6:
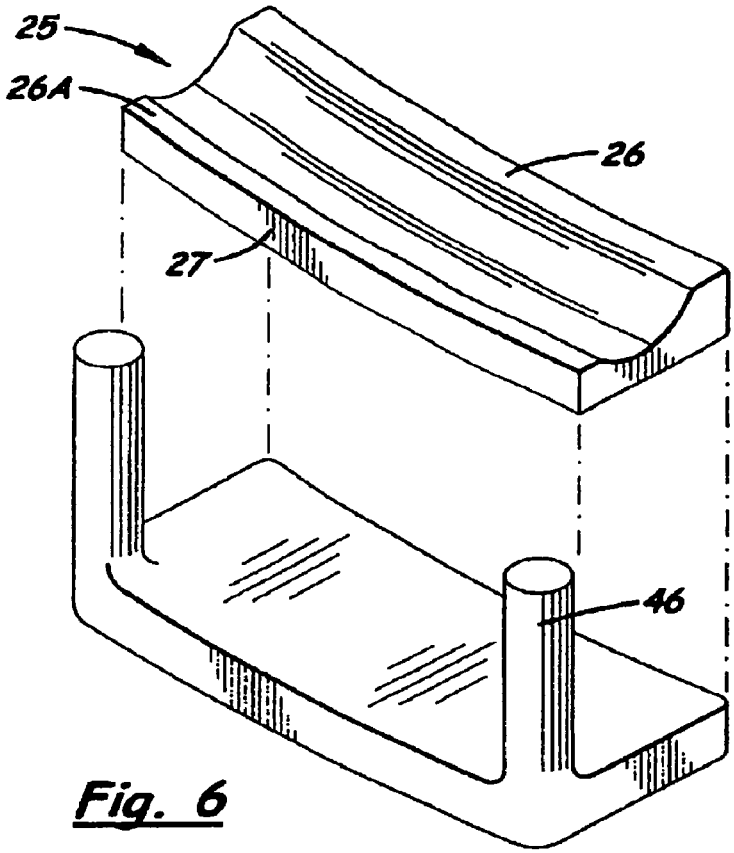
FIG. 6 is a perspective view of the elongated lower pad used with an elongated lower clamping member.

The inside surface 26 of the lower pad 25 is specifically designed to match the curvature of the instrument's bottom surface 96 immediately adjacent to the lower edge 97. In the preferred embodiment, the outside surface 28 is perpendicularly aligned with the front and rear surfaces 27, 29, respectively. The rear surface 29 is substantially perpendicular to the outside surface 28. The front and rear surfaces 27, 29 are curved outward, as shown in FIGS. 5 and 6. Like the upper pad 15, a short segment 26A of the inside surface 26 adjacent to the rear surface 29 is horizontally aligned, thereby creating a short lip structure 30 that extends rearward from the lower edge 97 of the instrument 90. When assembled, both lip structures 20, 30 extend rearward to prevent the lower metal rods 46, 46' used with clamping elements 40, 40' from contacting the lower edge 97 and causing damage.

The two pads 15 and 25 are also sufficient in width so that they are centrally aligned over the transverse axis of the instrument's sidewall 99. This ensures that the compression forces exerted by the chinrest are applied to the sidewall 99 and not to the non-support sections of the top and bottom surfaces 92, 96.

Figure 2:
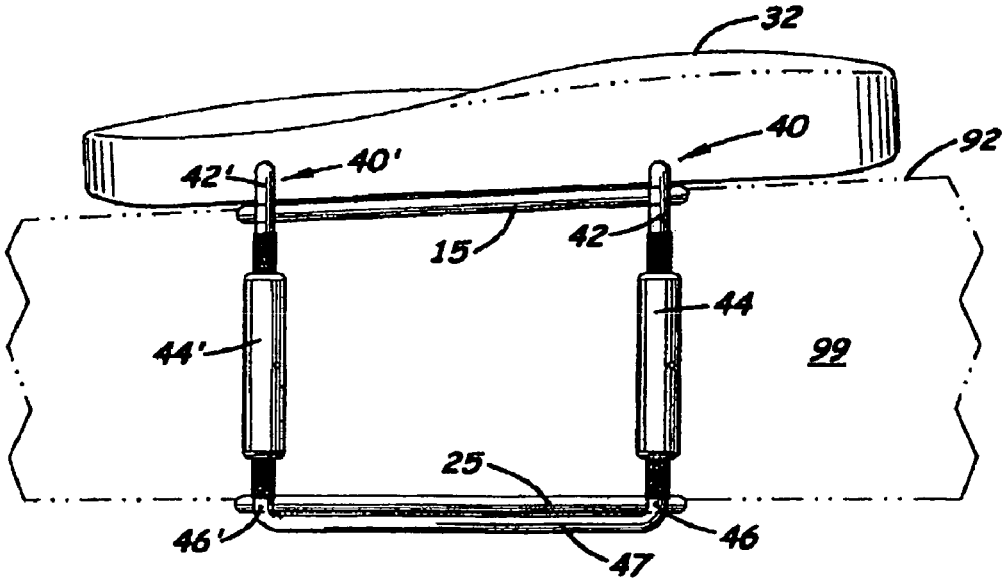
FIG. 2 is a rear elevational view of the instrument with the chinrest pad system shown in FIG. 1.

FIGS. 1 and 2 more clearly shows the side elevational view of a violin 90 with a chinrest mounted thereon that uses the pad system 10. The violin 90 includes a top surface 92, a bottom surface 96, a sidewall 99, an upper angled edge 93, and a lower angled edge 97. The portions of the top and bottom surfaces 92, 96 located adjacent to the upper and lower edges 93, 97 first curve inward, then flatten, then curve outward towards the wider section of the instrument 90. The upper and lower angled edges 93, 97, respectively, are located directly opposite each other on opposite sides of the instrument's sidewall 99.

During use, the chinrest member 32 is positioned over the top surface 92 of the instrument 90 to comfortably receive a user's chin when playing. The chinrest member 32 includes a flat support surface 34 that rests against the top surface 92 of the instrument 90. As shown in FIG. 2, attached to the rear surface 33 of the chinrest member 32 are two upper metal rods 42, 42' respectively, that in turn connect to the top end of two turnbuckles 44, 44'. Attached to the opposite end of the turnbuckles 44, 44' are L-shaped lower metal rods 46, 46', respectively. Disposed between the two lower metal rods 46, 46' is an elongated flange lower 47 designed to engage the bottom surface 96 adjacent to the lower angled edge 97. The turnbuckles 44, 44' both include opposite internal threads (not shown) that enable them to move over the rods 42, 42', 46, 46', respectively, to tighten or loosen the chinrest member 32 and lower flange 47 on opposite surfaces of the instrument 90.

Figure 7:
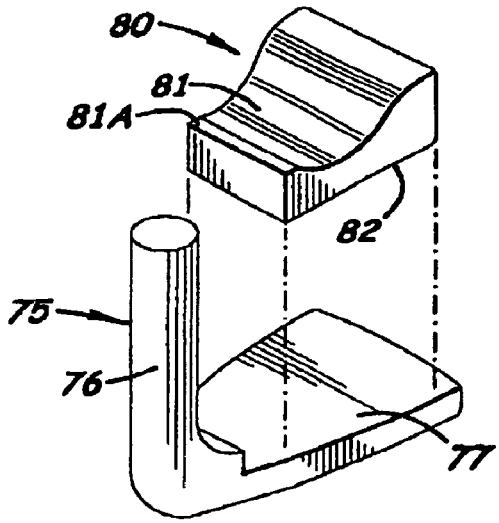
FIG. 7 is a perspective view of a single triangular-shaped lower pad used on a single lower clamping member.

FIG. 7 shows a second embodiment of the lower pad 80 used with a single lower clamping member 75 that includes a small, single lower flange 77. The lower pad 80 is triangular with straight front and rear surfaces and two curved side surfaces designed to match the overall shaped of the lower flange 77. The inside and outside surfaces 81, 82 of the lower pad 80, respectively, are identical in cross-section to the inside and outside surfaces 26 and 28, respectively, on the lower pad 25.

In the preferred embodiment, the upper and lower pads 15, 25, and 80 are made of natural or synthetic elastic material approximately ⅛ inch thick. On the first embodiment, pads 15 and 25 measure approximately 2-½ inches in length and approximately ½ inch in width. On the second embodiment, the lower pad 80 measures approximately ½ inch in width along the rear surface, approximately ¼ inch in width along the front surface, and approximately ½ inch in length.

Using the above described pad system 10 a method of attaching a chinrest 8 to a string instrument 90 is provided comprising the following steps;

a. selecting a chinrest 8 that includes a chinrest member 32 with a support surface 34, two adjustable clamping elements 40, 40', each said clamping element 40, 40' includes at least one upper metal rod 42 that connects to said chinrest member 32, a turnbuckle, and a lower metal rod 46 that includes a lower flange 47 b. selecting an upper pad 15 that includes an inside surface 16 that matches the curvature of the top surface 92 of a string instrument 90 and a flat outside surface 17, said upper pad 15 also including a rearward extending lip structure 20 that prevents said upper metal rod 42 on said clamping element 40 from contacting the lower angled edge 97 of the string instrument 90;

c. positioning said upper pad 15 over said instrument so that said outside surface 27 is disposed under said support surface on said chinrest member 32;

d. selecting a lower pad 25 that includes a flat outside surface surface 28 and an inside surface 26 that matches the curvature of a lower angled edge 97 and adjacent surface 96 of said instrument 92, said lower pad 25 also including a rearward extending lip structure 30 that prevents said lower metal rod 46 or 46' on said clamping element 40, or 40' from contacting the lower angled edge 97 on said instrument 92.

e. positioning said outside surface 28 of said lower pad 25 on said flange 47 on said clamping member 40; and, f. positioning said chinrest member 32 over said instrument 90 so that said inside surface 16 on said upper pad 15 engages the upper angled edge 93 and adjacent surface 92 of said instrument 90;

g. positioning said clamping member 32 so that said inside surface 26 of said lower pad 25 engages the lower angle edge 97 and adjacent surface 96 of said string instrument 90;

h. adjusting said clamping element 40 until said chinrest member 32 is held securely on said instrument 90.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A chinrest pad system for use with a chinrest including a chinrest member with a support surface, two adjustable clamping elements, each said clamping element includes an upper metal rod that connects to said chinrest member and a lower metal rod that includes a lower flange plate and a turnbuckle, said pad system comprising;

a. an upper pad with an flat outside surface and a lower inside surface that matches the curvature of a upper angled edge and adjacent surface of a string instrument, said upper pad also including a rearward extending lip that partially extends around said upper angled edge and prevents said upper metal rod on said clamping element from contacting said upper angle edge of said string instrument; and, b. a lower pad with a flat outside surface and an inside surface that matches the curvature of a lower angled edge and adjacent surface of a string instrument, said lower pad also including a rearward extending lip structure that prevents said lower metal rod on said clamping element from contacting said lower angled edge of said string instrument.

2. The chinrest pad system as recited in claim 1, wherein said upper pad is a narrow, elongated structure that extends transversely under a chinrest member.

3. The chinrest pad system, as recited in claim 2 , wherein said upper pad is made of elastic material.

4. The chinrest pad system as recited in claim 2, wherein said lower pad is a narrow, elongated structure.

5. The chinrest pad system as recited in claim 4, wherein said lower pad is made of elastic material.

6. The chinrest pad system as recited in claim 5, wherein said lower pad is made of cork.

7. The chinrest pad system as recited in claim 4, wherein said upper pad is made of cork.

8. The chinrest pad system as recited in claim 1, wherein said lower pad is a narrow, elongated structure.

9. The chinrest pad system as recited in claim 8, wherein said lower pad is made of elastic material.

10. The chinrest pad system as recited in claim 9, wherein said lower pad is made of cork.

11. The chinrest pad system, as recited in claim 1, wherein said lower pad is flat triangular structure.

12. The chinrest pad system, as recited in claim 11, wherein said lower pad is made of elastic material.

13. The chinrest pad system as recited in claim 12, wherein said lower pad is made of cork.

14. A method for minimizing dampening and preventing damaged cause by a chinrest on a string instrument, comprising the following steps:

a. selecting a chinrest that includes a chinrest member with a support surface, two adjustable clamping elements, each said clamping element includes at least one upper metal rod that connects to said chinrest member, a turnbuckle, and a lower metal rod that includes a lower flange;

b. selecting an upper pad that includes an inside surface that matches the curvature of the top surface of a string instrument and a flat outside surface, said upper pad also including a rearward extending lip structure that prevents said upper metal rod on said clamping element from contacting the upper angled edge of the string instrument;

c. positioning said upper pad over said instrument so that said outside surface is disposed under said support surface on said chinrest member;

d. selecting a lower pad that includes a flat outside surface and an inside surface that matches the curvature of a lower angled edge and adjacent surface of said instrument, said lower pad also including a rearward extending lip structure that prevents said lower metal rod on said clamping element from contacting the lower angled edge on said instrument e. positioning said outside surface of said lower pad on said flange on said clamping member; and, f. positioning said chinrest member over said instrument so that said inside surface on said upper pad engages the upper angled edge and adjacent surface of said instrument;

g. positioning said clamping member so that said inside surface of said lower pad engages the lower angle edge and adjacent surface of said string instrument;

h. adjusting said clamping element until said chinrest member is held securely on said instrument.

*15. A chinrest pad system for use with a chinrest including a chinrest member with a support surface, two adjustable clamping elements, each said clamping element includes an upper metal rod that connects to said chinrest member and a lower metal rod that includes a lower flange plate and a turnbuckle, said pad system comprising;*

*at least an upper pad with an outside surface and an oppositely arranged lower inside surface that matches the curvature of a upper angled edge and adjacent surface of a string instrument, said upper pad also including a rearward extending lip that partially extends around said upper angled edge and prevents said upper metal rod on said clamping element from contacting said upper angle edge of said string instrument when said chinrest pad system is in place on said string instrument.*

*16. A chinrest pad system for use with a chinrest including a chinrest member with a support surface, two adjustable clamping elements, each said clamping element includes an upper metal rod that connects to said chinrest member and a lower metal rod that includes a lower flange plate and a turnbuckle, said pad system comprising;*

*at least a lower pad with an outside surface and an oppositely arranged inside surface that matches the curvature of a lower angled edge and adjacent surface of a string instrument, said lower pad also including a rearward extending lip structure that prevents said lower metal rod on said clamping element from contacting said lower angled edge of said string instrument when said chinrest system is in place on said string instrument.*

*17. A method for minimizing dampening and preventing damage caused by a chinrest on a string instrument, comprising the following steps:*

*selecting a chinrest that includes a chinrest member with a support surface, two adjustable clamping elements, each said clamping element includes at least one upper metal rod that connects to said chinrest member, a turnbuckle, and a lower metal rod that includes a lower flange;*

*selecting an upper pad that includes an inside surface that matches the curvature of the top surface of a string instrument and an oppositely arranged outside surface, said upper pad also including a rearward extending lip structure that prevents said upper metal rod on said clamping element from contacting the upper angled edge of the string instrument;*

*positioning said upper pad over said instrument so that said outside surface is disposed under said support surface on said chinrest member;*

*positioning said chinrest member over said instrument so that said inside surface on said upper pad engages the upper angled edge and adjacent surface of said instrument;*

*positioning said clamping member so that said lower flange engages the lower angle edge and adjacent surface of said string instrument;*

*adjusting said clamping element until said chinrest member is held securely on said instrument.*

* * * * *